United States Patent
Wheatley et al.

(10) Patent No.: US 9,209,648 B2
(45) Date of Patent: Dec. 8, 2015

(54) SELF-CONTAINED RENEWABLE BATTERY CHARGER

(75) Inventors: Desmond Wheatley, Rancho Santa Fe, CA (US); Patrick Senatore, San Diego, CA (US); Robert L. Noble, Encinitas, CA (US)

(73) Assignee: ENVISION SOLAR INTERNATIONAL, INC., San Diego, CA (US)

( * ) Notice: Subject to any disclaimer, the term of this patent is extended or adjusted under 35 U.S.C. 154(b) by 468 days.

(21) Appl. No.: 13/572,540

(22) Filed: Aug. 10, 2012

(65) Prior Publication Data

US 2014/0042956 A1 Feb. 13, 2014

(51) Int. Cl.
*H01M 10/44* (2006.01)
*H01M 10/46* (2006.01)
*H02J 7/00* (2006.01)
*H02J 7/35* (2006.01)

(52) U.S. Cl.
CPC ............ *H02J 7/35* (2013.01); *H02J 7/0044* (2013.01); *H02J 7/0042* (2013.01); *Y02E 10/566* (2013.01); *Y10T 29/49117* (2015.01)

(58) Field of Classification Search
CPC ... Y02T 90/14; Y02T 10/7088; Y02T 90/127; Y02T 10/90; B60L 2230/22; B60L 11/1824; B60L 2240/72; B60L 11/1838; B60L 11/1818; H02J 7/35; H02J 7/0027; H02J 3/383
USPC .................................................. 320/101, 109
See application file for complete search history.

(56) References Cited

U.S. PATENT DOCUMENTS

| | | | |
|---|---|---|---|
| 5,315,227 A | 5/1994 | Pierson et al. | |
| 2010/0235206 A1* | 9/2010 | Miller et al. | 705/7 |
| 2011/0049992 A1* | 3/2011 | Sant'Anselmo et al. | 307/64 |
| 2011/0055037 A1 | 3/2011 | Hayashigawa et al. | |
| 2012/0182670 A1* | 7/2012 | Prax et al. | 361/641 |
| 2012/0260617 A1* | 10/2012 | Gilpatrick | 56/11.9 |
| 2013/0037080 A1* | 2/2013 | Helfan et al. | 136/245 |
| 2013/0127395 A1* | 5/2013 | Santos Silva Serra Duarte | 320/101 |

FOREIGN PATENT DOCUMENTS

WO 2011142683 A1 11/2011
WO 2012090191 A1 7/2012

OTHER PUBLICATIONS

PCT International Search Report, Application No. PCT/US2013/046834, Jun. 20, 2013.

* cited by examiner

*Primary Examiner* — Nghia Doan
(74) *Attorney, Agent, or Firm* — Nydegger & Associates

(57) ABSTRACT

A self-contained, portable unit for charging a battery of an electric vehicle is disclosed. The portable unit includes a moveable docking pad that has a generally flat, horizontal base and is formed with a compartment for holding at least one storage battery. The first end of a column is mounted onto the docking pad and oriented to extend upwardly from the docking pad to a second column end. A solar array is affixed to the second end of the column for deployment over the docking pad. The electric current from the solar array is fed to the storage battery using a charge management system. The battery, in turn, is connected to an EV charge station which produces a charging current to charge the battery of an electric vehicle.

20 Claims, 4 Drawing Sheets

SELF-CONTAINED RENEWABLE BATTERY CHARGER

FIELD OF THE INVENTION

The present invention pertains generally to electric charging systems for vehicles and devices. More particularly, the present invention pertains to systems and methods for charging electric vehicles using solar energy. The present invention is particularly, but not exclusively, useful as a portable, self-contained charging system for efficiently storing energy from solar arrays and using the stored energy to charge the batteries of an electric vehicle.

BACKGROUND OF THE INVENTION

Electric vehicles (EV), which can include all-electric vehicles and hybrids such as gas/electric vehicles, are growing in popularity among consumers. These vehicles offer an environmentally friendly alternative to vehicles powered exclusively by petroleum products. In particular, EV's have lower emissions of smog precursor gases, and they emit little to no greenhouse gases which have been linked to 'global warming'. In addition, as the cost of petroleum products has increased, the use of electric vehicles has become more economically beneficial.

Modernly, nearly all EV's include one or more on-board batteries for storing the electrical energy that is necessary to drive one or more electric motors and produce vehicle locomotion. One technique for recharging the on-board batteries includes connecting the vehicle to a permanently installed recharging station which receives its power from the electrical grid. For example, most EV operators have a charging station at the location where the car is usually stored, such as the operator's home or business. Unfortunately, access to additional recharge stations is somewhat limited at the present time in most areas. Although the range that an EV is able to travel before its battery must be recharged has improved in recent years, EV's still require a recharge during trips of moderate to long duration.

As electric vehicles become more common, for many EV operators, their electric vehicle may be their only vehicle. As such, many of these EV operators will desire to use their electric vehicle for all of their transportation needs including relatively long trips such as vacations, etc. To increase the useful range of the electric vehicle, operators will need to access charging stations at locations other than their primary vehicle storage sites. In some cases, there may be a need to provide a charging station on a temporary basis, for example, to provide coverage at a particular event. Alternatively, it may be desirable to provide a temporary charging station at a remote location while a more permanent charging station is being installed. In some instances, the temporary location requiring a charging station may not have ready access to the electrical grid. In other instances, the cost of providing a permanently installed charging station may be prohibitive or the lead-time associated with a permanent installation may be unsatisfactory.

In light of the above, it is an object of the present invention to provide a system for effectively and efficiently charging electric vehicles that can be flexibly moved to a variety of different locations where EV charging is needed. Another object of the present invention is to provide a system and method for quickly establishing an EV charging station at a location without requiring access to power from the electrical grid. Yet another object of the present invention is to provide a portable, self-contained system that is capable of providing renewable energy from solar arrays to charge an EV. An additional object of the present invention is to provide a self-contained renewable battery charger that is easy to use, is relatively simple to manufacture, and is comparatively cost effective.

SUMMARY OF THE INVENTION

In accordance with the present invention, a portable unit for charging a battery of an electric vehicle includes a moveable docking pad. For the portable unit, the docking pad includes a generally flat, horizontal base and is formed with a compartment for holding at least one storage battery and electronics. The portable unit also includes a column having a first end that is mounted onto the docking pad and a second end. Structurally, the column is oriented to extend upwardly from the docking pad to the second column end. There, at the second end of the column, a solar array is affixed to the column.

In a first embodiment of the present invention, the solar array is configured to produce a direct current (DC) output. For this embodiment, the current from the solar array is fed to the storage battery using charge management electronics. The battery, in turn, is connected to an EV charge station which produces a charging current to charge an external battery, such as the battery of an electric vehicle. An inverter can also be provided in the portable unit to generate alternating current (AC) from the DC battery output. The AC power from the inverter can be fed to the EV charge station and/or other AC loads in the portable unit such as lights, 120 VAC outlets, USB outlets, etc.

In another embodiment of the present invention, the solar array is configured to produce an AC output. For example, each photovoltaic module in the solar array can include a micro-inverter. For this embodiment, the combined current from the photovoltaic modules is converted to DC at an inverter/charger and fed to the storage battery. In addition, AC power from the solar array can be fed to an EV charge station through the inverter/charger. Finally, the inverter/charger can convert DC power from the battery storage to AC power for the EV charge station. The storage battery can also connect directly to the EV charge station. With this arrangement, the EV charge station can produce a charging current for the EV battery from the AC solar array power which is supplemented with power from the storage battery.

Also for the present invention, a tracking mechanism can be integrated into the column for moving the solar array to adjust the solar array orientation and maximize the incidence of sunlight on the photovoltaic modules. More specifically, the tracking mechanism can be positioned to interconnect a stationary portion of the column with the solar array. With this arrangement, the tracking mechanism can be used to selectively move the solar array relative to the stationary docking pad. In some cases, the solar array movements can be in accordance with a predetermined cycle that is developed based on the position and movements of the sun.

To assist in transporting the portable unit, a pivot mechanism can be provided between the column and docking pad to selectively pivot the solar array between a deployed configuration and a stowed configuration. In the deployed configuration, the solar array extends from the column to a free end and overlays the base. In the deployed configuration, the solar array and docking pad are arranged to provide ballast to the portable unit to prevent tipping in adverse weather conditions. The ballast against tipping is further increased by the weight and arrangement of the storage batteries in the docking pad compartment. In the stowed configuration, the solar array is folded about the pivot point such that the free end of the solar array is adjacent to the docking pad. Once adjacent to the docking pad, the free end can be attached to the docking pad to secure the solar array for transport.

In a particular arrangement of the portable EV battery charging unit, the docking pad is shaped substantially as a right rectangle with long sides and shorter ends. In some cases, the docking pad can be formed with wheel blocks to stabilize the vehicle on the docking pad. To provide for an alignment of the vehicle on the docking pad, a portion of the docking pad can be formed to extend upwardly from the docking pad base and is centered on the docking pad base.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
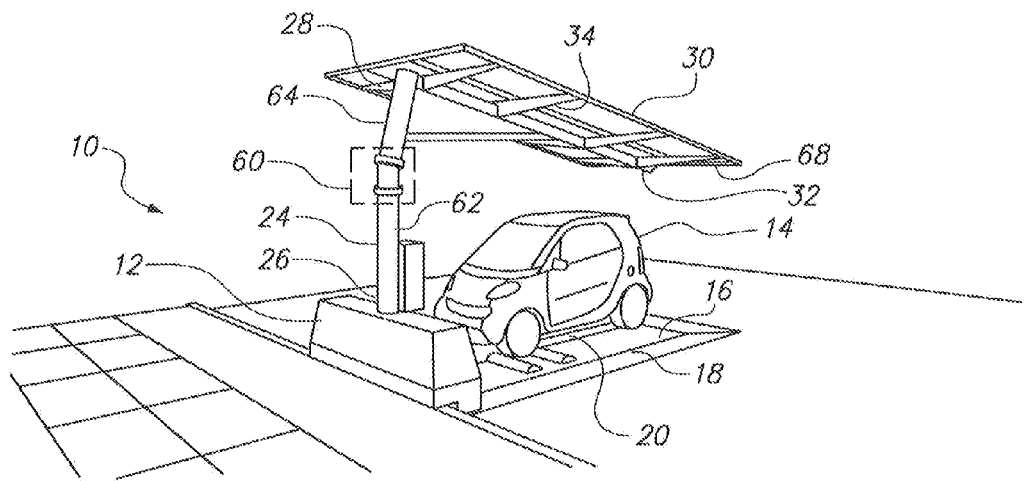
FIG. 1 is a front perspective view of a self-contained renewable battery charger in an operational environment.

Referring initially to FIG. 1, a system in accordance with the present invention is shown and is generally designated 10. As shown, the system 10 includes a portable unit 12 for charging an electric vehicle 14. As described herein, the portable unit 12 can be transported, after assembly, to a location such as the parking lot shown, where it can operate to charge an electric vehicle 14 without necessarily being connected to the electrical grid (not shown) or another source of electrical power.

Figure 2:
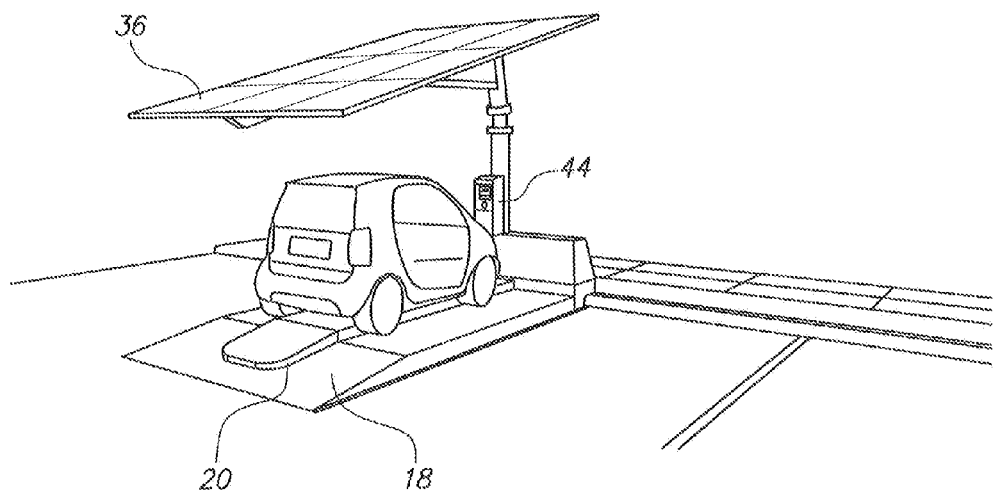
FIG. 2 is rear perspective view of the self-contained renewable battery charger shown in FIG. 1.
Figure 3:
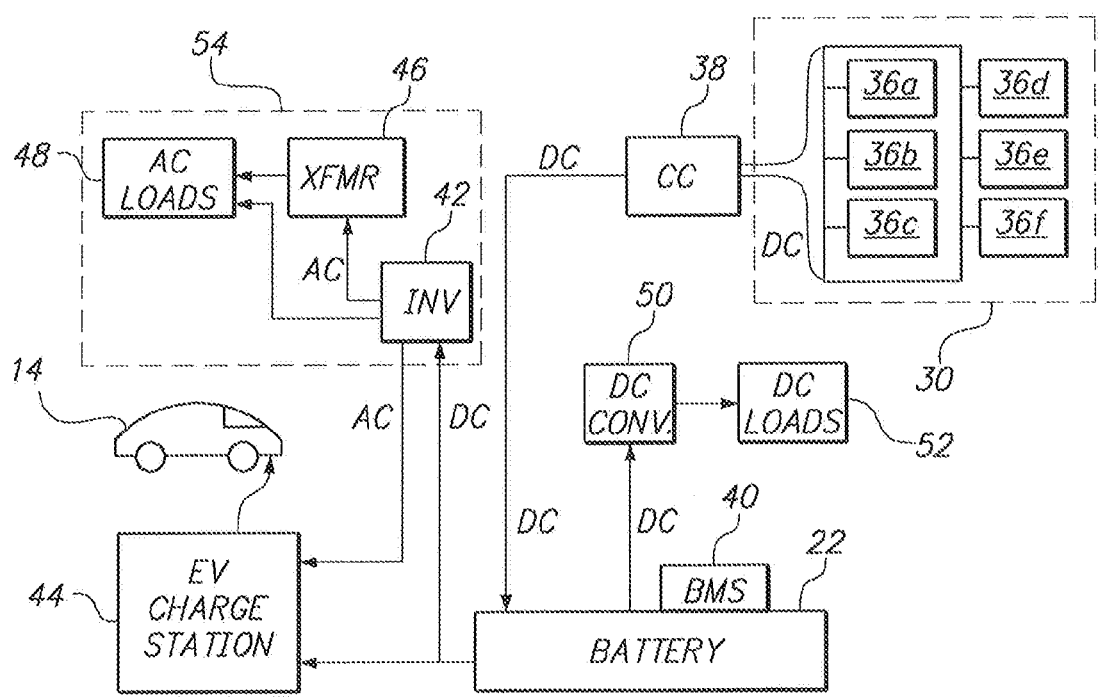
FIG. 3 is a schematic illustration showing an arrangement of electrical components for use in a self-contained renewable battery charger in which the solar array provides a DC output.

Cross-referencing FIGS. 1 and 2, it can be seen that the portable unit 12 includes a moveable docking pad 16 having a base 18 and a compartment 20 for holding at least one storage battery 22 and electronics (see FIG. 3). It is to be appreciated that the term 'battery' as used herein includes a battery bank having one or more batteries and/or battery cells that are operatively connected together. As shown, the base 18 of the docking pad 16 may be of suitable construction to support the weight of a vehicle 14 and formed with bumps to help hold the vehicle 14 on the base 18. Typically, as shown, the base 18 can include a generally flat, horizontal portion and a ramp to allow the vehicle 14 to access and park on the horizontal portion. It can further be seen that the portable unit 12 includes a column 24 having a first end 26 that is mounted onto the docking pad 16 and a second column end 28. As shown, the column 24 is oriented to extend upwardly, and in some cases vertically, from the docking pad 16.

Continuing with reference to FIGS. 1 and 2, it can be seen that a solar array 30 is affixed to the second end 28 of the column 24. For the arrangement shown, a structural canopy having a beam 32 and cross members 34 is attached to the column 24 to support a plurality of photovoltaic modules 36 (best seen in FIG. 2) that are arranged in the array 30. For the present invention, the photovoltaic modules 36 can include any type of photovoltaic cell known in the pertinent art.

FIG. 3 shows an embodiment of the present invention in which the solar array 30 is configured to produce a direct current (DC) output. As shown, an exemplary string(s) of photovoltaic modules 36 are electrically connected in parallel to produce an electrical output that is fed to a Charge Controller 38 which includes a Maximum Power Point Tracker. The CC 38 functions as a DC to DC converter that provides the most efficient power draw from solar array 30 using maximum power point tracking logic while managing DC battery charging. The output of the CC 38 is fed to the storage battery 22 using Battery Management System (BMS 40). The battery 22 is sized with a capacity to store enough energy for EV charging, e.g. level 1 (110V) or level 2 (220V) EV charging, and to provide continuous system functionality. The BMS 40 ensures correct battery charging, discharging, balancing, and may be included or excluded depending on battery chemistry. Inverter 42 receives and converts a DC battery output to alternating current (AC), which is turn, is directed to an electric vehicle charging station 44 (see also FIG. 2). In addition, as shown in FIG. 3, auxiliary AC loads 48, which can include, for example, lights and 120 VAC and USB outlets, can be powered from the inverter 42 or through an optional transformer 46.

As shown in FIG. 3, the Electric Vehicle Charging Station 44 receives DC power from the battery 22 and can also receive AC power from the inverter 42. Typically, the components are sized to allow the Electric Vehicle Charging Station 44 to provide Level 2 EV charging. In level 2 EV charging, AC energy is provided to the on-board charger of the vehicle 14. The AC energy is in the range of 208-240 volts, single phase, with a maximum current of 32 amps (continuous) and a branch circuit breaker rated at 40 amps.

FIG. 3 also shows that one or more DC/DC converters 50 can be provided to produce a constant DC voltage from a battery 22 output that is suitable for auxiliary DC loads 52. These DC loads can include, for example, motors, controllers, network hardware, and USB outlets. In addition to the components shown in FIG. 3, it is to be appreciated that one or more breakers and/or relays (not shown) may be included for proper system control and safety.

For some applications, an all DC arrangement may be used. For this arrangement, the components of FIG. 3 can be used without the AC components (box 54). For this arrangement, the vehicle charging station 44 receives DC power from the battery 22 and provides DC energy to an on-board charger of the vehicle 14. In some cases, the all-DC system may be more energy efficient because DC to AC conversion losses are eliminated.

Figure 4:
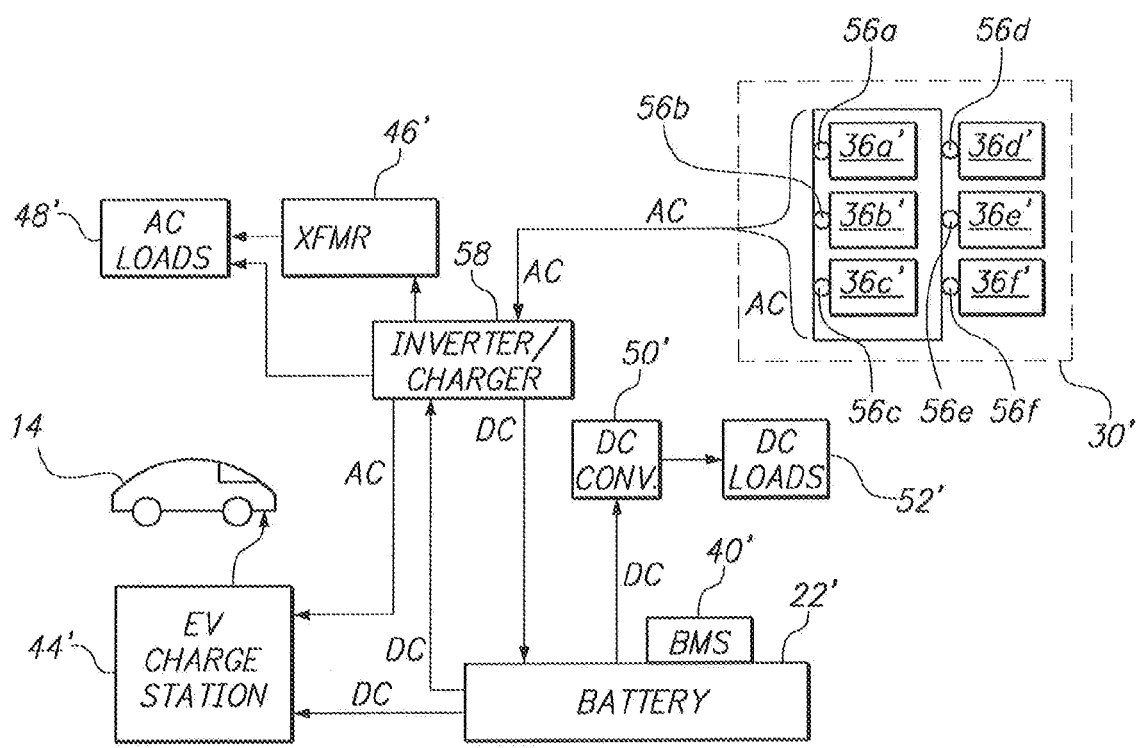
FIG. 4 is a schematic illustration showing a second arrangement of electrical components for use in a self-contained renewable battery charger in which the solar array provides a AC output.

FIG. 4 shows another embodiment of the present invention in which the solar array 30' is configured to produce an AC output. As shown, each photovoltaic module 36a'-36i' in the solar array 30' includes a respective micro-inverter 56a-i. For the embodiment shown in FIG. 4, each micro-inverter contains maximum power point tracking logic to ensure that the most efficient power draw is obtained from solar array 30'. As shown, a string(s) of photovoltaic modules 36 are electrically connected in parallel to produce an electrical output that is fed to the inverter/charger 58. In an optional embodiments, a charge controller as described above with reference to FIG. 3 can be connected to the output of the solar array 30'. MPPT 38'. Alternatively, the solar array 30' can feed a string inverter (not shown) replacing the micro-inverters 56a-f shown in FIG. 4.

Continuing with FIG. 4, it can be seen that AC from the solar array 30' can be converted to DC at an inverter/charger 58 and fed to the storage battery 22' using a battery management system 40' (as described above). In addition, the inverter/charger 58 can tunnel AC power from the solar array 30' to the EV charge station 44' and/or convert DC from the battery 22' to AC and feed the AC to the charge station 44'.

For the FIG. 4 embodiment, the battery 22' is sized with a capacity to store enough energy for EV charging, e.g. level 1 (110V) or level 2 (220V) EV charging, and to provide continuous system functionality. In addition, as shown in FIG. 4, auxiliary AC loads 48', which can include, for example, motors, controllers, network hardware, USB outlets, lights and 120 VAC and USB outlets, can also be powered from the inverter/charger 58 or through an optional transformer 46'. Also shown, the Electric Vehicle Charging Station 44' may receive DC power from the battery 22'.

FIG. 4 also shows that one or more DC/DC converters 50' can be provided to produce a constant DC voltage from a battery 22' output that is suitable for auxiliary DC loads 52'. These DC loads can include, for example, motors, controllers, network hardware, and USB outlets. In addition to the components shown in FIG. 4, it is to be appreciated that one or more breakers and/or relays (not shown) may be included for proper system control and safety.

Referring back to FIG. 1, it can be seen that the portable unit 12 can also include a tracking mechanism 60 that is integrated into the column 24 for moving the solar array 30. This movement can be performed to adjust to the orientation of the solar array 30 to maximize the incidence of sunlight on the solar array 30 (i.e. point the solar array 30 toward the sun). This adjustment can be made initially during setup and installation and/or during operation. As shown, the tracking mechanism 60 can be positioned to interconnect a stationary portion 62 of the column 24 with a moveable portion 64 of the column 24, which in turn, is attached to the solar array 30. For example, a suitable tracking mechanism for use in the present invention is disclosed and claimed in co-owned U.S. patent application Ser. No. 13/099,152, titled, "Device for Continuously Orienting a Solar Panel", filed May 2, 2011 for inventors Robert L. Noble and Desmond Wheatley, the entire contents of which are hereby incorporated by reference herein. With the arrangement shown in FIG. 1, the tracking mechanism 60 can be used to selectively move the solar array 30 relative to the stationary docking pad 16. In some cases, the movements of the solar array 30 can be in accordance with a predetermined cycle that is developed based on the position and movements of the sun.

Figure 5:
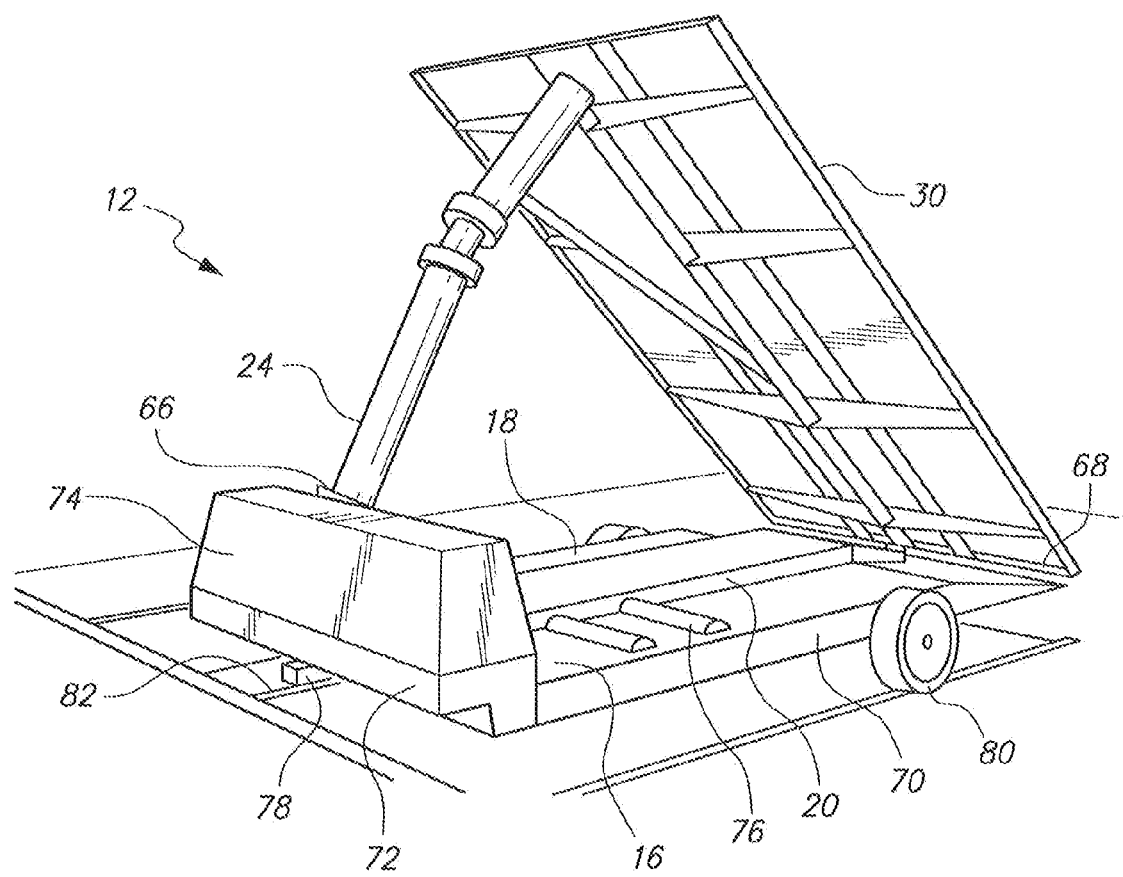
FIG. 5 is a perspective view of a self-contained renewable battery charger loaded on a carriage for transport with the solar array positioned in a stowed configuration.

FIG. 5 shows that the portable unit 12 can include a pivot mechanism 66 located between the column 24 and docking pad 16. Cross-referencing FIGS. 1 and 5, it can be seen that the pivot mechanism 66 allows the solar array 30 and column 24 to be pivoted between a deployed configuration (FIG. 1) and a stowed configuration (FIG. 5). In the deployed configuration shown in FIG. 1, the solar array 30 extends from the column 24 to a free end 68 and overlays the docking pad 16. More specifically, the solar array 30 is positioned above the docking pad 16. Regardless whether the solar array 30 is in the deployed configuration (FIG. 1), or in the stowed configuration (FIG. 5), the docking pad 16 provides ballast (i.e. balance) to the portable unit 12 to prevent tipping. This ballast against tipping is further increased due to the weight of the storage batteries 22 (labeled in FIG. 3) that are positioned in the compartment 20 and distanced from the pivot mechanism 66 and column 24. Additionally, as will be appreciated by the skilled artisan, articles used as concrete ingots can be selectively used for ballast, and can subsequently be removed to provide for placement of additional batteries, if required. In the stowed configuration (FIG. 5), the solar array 30 is folded about the pivot mechanism 66 such that the free end 68 opposite the pivot mechanism 66 is adjacent to the docking pad 16. Once adjacent to the docking pad 16, the free end 68 can be attached to the docking pad 16 to secure the solar array 30 for transport.

Continuing with FIG. 5, it can be seen that the docking pad 16 can be shaped substantially as a right rectangle with long sides 70 and shorter ends 68, 72 and includes a housing 74 for holding some or all of the electrical components shown in FIG. 3 or FIG. 4. As shown, the docking pad 16 is sized to accommodate an electric vehicle 14 (see FIG. 1) and can be formed with wheel blocks 76 to stabilize the vehicle 14 on the docking pad 16. Also shown, the docking pad compartment 20 can be formed to extend upwardly from the docking pad base 18. In addition, the raised compartment 20 can be centered on the docking pad 16 between the sides 70 to provide for an alignment of the vehicle 14 (see FIG. 1) on the docking pad 16 to reduce the risk of a vehicle 14 accidently driving off the side of the docking pad 16.

FIG. 5 further illustrates that the portable unit 12 can be transported on a carriage 78 having wheels 80 and a ball-hitch receiver 82 for attachment to a tow vehicle such as a truck (not shown). For example, the portable unit 12 can be lifted from the carriage 78 using jacks, e.g. four jacks (not shown). Once lifted, the carriage can be rolled out from underneath the portable unit 12 and the portable unit 12 can be lowered into an operational position using the jacks. Once properly positioned, the pivot mechanism 66 can be used to deploy the solar array 30. To transport the portable unit 12 from a site, the portable unit 12 can be jacked up, the carriage 78 rolled underneath and the jacks used to lower the portable unit 12 onto the carriage 78. Alternatively, a crane (not shown) or forklift (not shown) may be used to load or unload the portable unit 12 onto/from a carriage 78 or truck (not shown).

As envisioned for the system 10, the portable unit 12 can be remotely monitored in any manner well known in the pertinent art. Stated differently, the health, performance and environmental condition pertinent to the operation of system 10 can be monitored on a continuous basis.

While the particular Self-contained Renewable Battery Charger as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A transportable unit for providing a self-contained renewable battery charger for an electric vehicle which comprises:

a moveable docking pad having a base with an access ramp for parking the electric vehicle on the base, wherein the docking pad is also formed with a compartment for holding at least one storage battery therein;

a column mounted on the docking pad for movement therewith and oriented substantially perpendicular thereto, with the column extending away from the docking pad and terminating at an attachment point;

a substantially flat panel affixed to the attachment point on the column for movement with the column;

an array of photovoltaic modules supported on the panel for movement therewith to convert solar energy from sun light into electrical energy, for transfer of the electrical energy from the photovoltaic modules to the storage battery in the compartment; and a charging station selectively positioned on the docking pad for movement therewith, and electrically connected with the storage battery in the compartment to establish a source for recharging an external battery in the vehicle.

2. The transportable unit as recited in claim 1 further comprising a charging management system electrically interconnecting the array of photovoltaic modules with the storage battery.

3. The transportable unit as recited in claim 1 further comprising an inverter electrically interconnecting the storage battery with the charging station to selectively convert direct current from the storage battery into an alternating current for the charging station.

4. The transportable unit as recited in claim 1 further comprising a tracking mechanism integrated into the column to interconnect a stationary portion of the column with the panel for moving the panel relative to the docking pad in accordance with a predetermined cycle to maximize the incidence of sunlight on the photovoltaic modules.

5. The transportable unit as recited in claim 1 wherein the docking pad is shaped substantially as a right rectangle with long sides and shorter ends, and wherein the column is located at an end of the docking pad to provide ballast for the unit, with the panel extending over the docking pad from the attachment point on the column to a free end of the panel.

6. The transportable unit as recited in claim 5 further comprising a pivot mechanism to selectively pivot the panel and column relative to the docking pad about a pivot point for lowering and securing the free end of the panel to the docking pad for transport of the unit.

7. The transportable unit as recited in claim 6 further comprising a carriage, wherein the carriage is selectively engaged with the docking pad to facilitate transport of the unit.

8. The transportable unit as recited in claim 1 wherein the external battery is mounted in the vehicle.

9. The transportable unit as recited in claim 8 wherein the docking pad is formed with wheel blocks to stabilize the vehicle on the docking pad.

10. The transportable unit as recited in claim 9 wherein the compartment of the docking pad extends upwardly from the docking pad base to provide for an alignment of the vehicle on the docking pad.

11. A self-contained battery charger for charging an electric vehicle, the battery charger comprising:

a moveable docking pad having a base with an access ramp for parking the electric vehicle on the base, and holding at least one storage battery therein;

a column mounted on the docking pad for movement therewith and extending therefrom;

a means for converting solar energy from sun light into electrical energy, said converting means mounted on said moveable column for movement therewith;

a means for transferring the electrical energy from the moveable converting means to the storage battery mounted on the moveable docking pad; and an electric vehicle charging station electrically connected with the storage battery mounted on the moveable docking pad for delivering a charging current to an electric vehicle battery.

12. The battery charger as recited in claim 11 wherein the converting means produces an alternating current output.

13. The battery charger as recited in claim 12 further comprising an inverter electrically interconnecting the converting means with the storage battery to convert alternating current from the converting means into direct current at the storage battery.

14. The battery charger as recited in claim 11 wherein the converting means produces a direct current output.

15. The battery charger as recited in claim 14 further comprising an inverter electrically interconnecting the storage battery with the electric vehicle charging station to convert direct current from the storage battery into alternating current at the electric vehicle charging station.

16. A method for preparing a self-contained renewable battery charger for charging an electric vehicle battery at a site, the method comprising the steps of:

providing a moveable docking pad having a base with an access ramp for parking the electric vehicle on the base, and holding at least one storage battery therein mounted on the moveable docking pad for movement therewith;

mounting a column onto the moveable docking pad for movement therewith to extend therefrom;

deploying a solar array on the moveable column to convert solar energy from sun light into electrical energy;

electrically connecting the solar array to the storage battery mounted on the moveable docking pad for movement therewith;

electrically connecting a vehicle charging station with the storage battery mounted on the moveable docking pad for movement therewith;

charging the storage battery with electrical energy from the solar array; and parking the electric vehicle for charging the electric vehicle battery with a charging current from the storage battery.

17. The method as recited in claim 16 further comprising the step of transporting an assembled self-contained renewable battery charger to the site and thereafter using the self-contained renewable battery charger to charge the electric vehicle battery.

18. The method as recited in claim 16 further comprising the steps of:

configuring the solar array into a stowed configuration relative to the moveable docking pad;

transporting an assembled self-contained renewable battery charger to the site; and reconfiguring the solar array into a deployed configuration relative to the docking pad.

19. The method as recited in claim 18 wherein the solar array is located directly above the moveable docking pad in the deployed configuration.

20. The method as recited in claim 18 wherein the transporting step is accomplished using a carriage.

* * * * *